Dec. 31, 1929.                J. H. LUCAS                1,741,784
                       CAR SEAT REVERSING MECHANISM
                          Filed Feb. 23, 1927        2 Sheets-Sheet 1
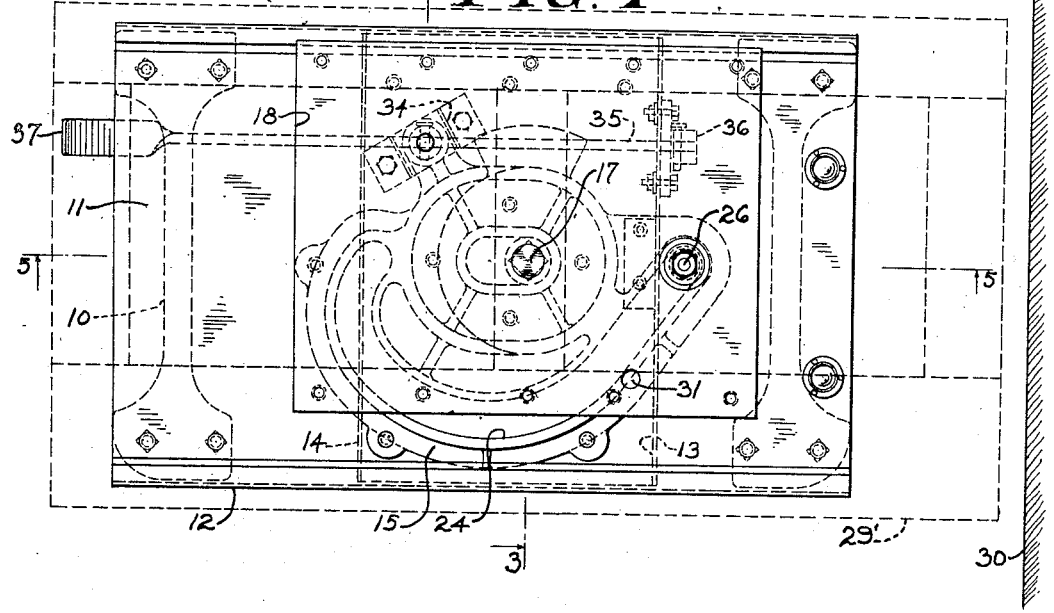
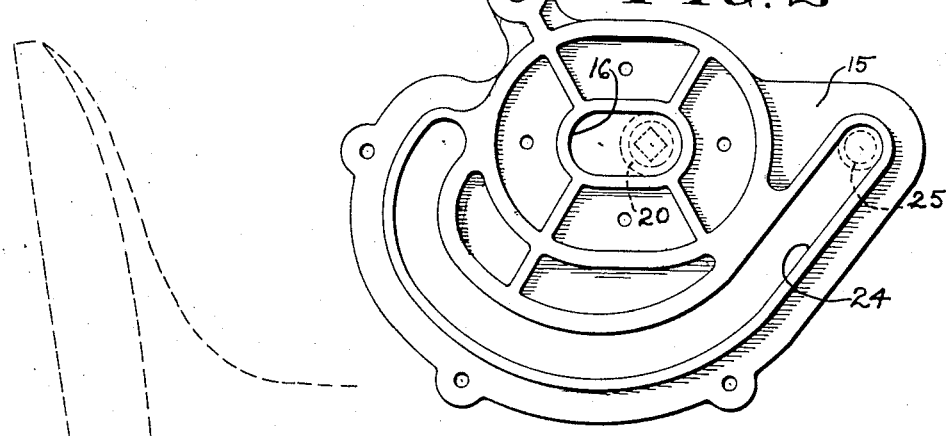
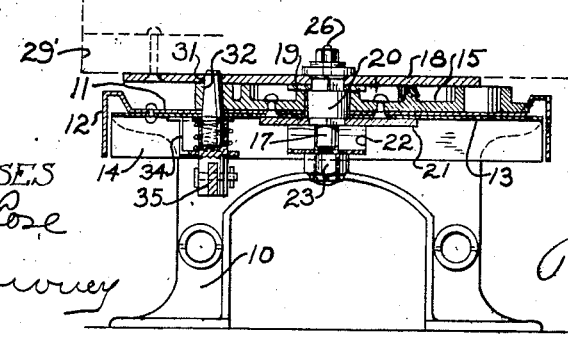

Dec. 31, 1929.　　　　　J. H. LUCAS　　　　　1,741,784
CAR SEAT REVERSING MECHANISM
Filed Feb. 23, 1927.　　2 Sheets-Sheet 2

WITNESSES
Irving J. Rose
M. E. Downey

INVENTOR
John H. Lucas,
By R. S. C. Caldwell
ATTORNEY

Patented Dec. 31, 1929

1,741,784

UNITED STATES PATENT OFFICE

JOHN H. LUCAS, OF MILWAUKEE, WISCONSIN, ASSIGNOR TO THE MILWAUKEE ELECTRIC RAILWAY & LIGHT COMPANY, OF MILWAUKEE, WISCONSIN, A CORPORATION OF WISCONSIN

CAR-SEAT-REVERSING MECHANISM

Application filed February 23, 1927. Serial No. 170,310.

The invention relates to car seats, and more particularly to the reversing mechanism by which car seats may be alternatively faced in opposite directions.

It has been customary in the construction of car seat reversing mechanism, especially as it concerned the two-passenger seats in steam and electric railway cars, to make use of a separate seat cushion and back in order to permit movement of the back to alternative positions and thereby change the facing direction of the seat, means being included for tilting the seat cushion to an appropriate angle in relation to the back. In such type of reversible seat the possibilities of comfortable construction were limited, as desirable proportions could not be attained. In cars which operate in one direction only seating of better characteristics could be had because the frames of the seat and back could be built together and better shape and proportion given to the cushion, so that a superior degree of comfort was rendered possible. In parlor cars and other reversible railway equipment of the first class it has been customary to provide individual chairs either freely movable or rotatable on a fixed base in order to provide the greater degree of comfort demanded, but such arrangement limited the seating capacity of the car. The rotating chair swinging on a fixed axis required excessive clearance at the side of the car in order to permit free swinging movement, and in a car of a size limited by clearance dimensions but two rows of such seats could be installed.

It is an object of the present invention to provide a car seat reversing mechanism which can be used for mounting a two-passenger seat of the solid frame construction heretofore limited to installation in one-way or non-reversible cars, the reversal of the seat being possible without requiring excessive clearance, thereby affording maximum seat width and maximum aisle width.

Another object of the invention is to provide locking mechanism of simple and inexpensive construction by which the seat may be firmly retained in its alternative positions. The invention further consists in the several features hereinafter set forth and more particularly defined by the annexed claims.

In the accompanying drawings, Fig. 1 is a plan view of a car seat reversing mechanism embodying the invention, the superposed seat being shown in dotted lines;

Fig. 2 is a detail plan view of a cam member included in the mechanism;

Fig. 3 is a transverse sectional view of the reversing mechanism taken on the line 3—3 of Fig. 1, the superposed seat being shown in dotted lines;

Figure 4:
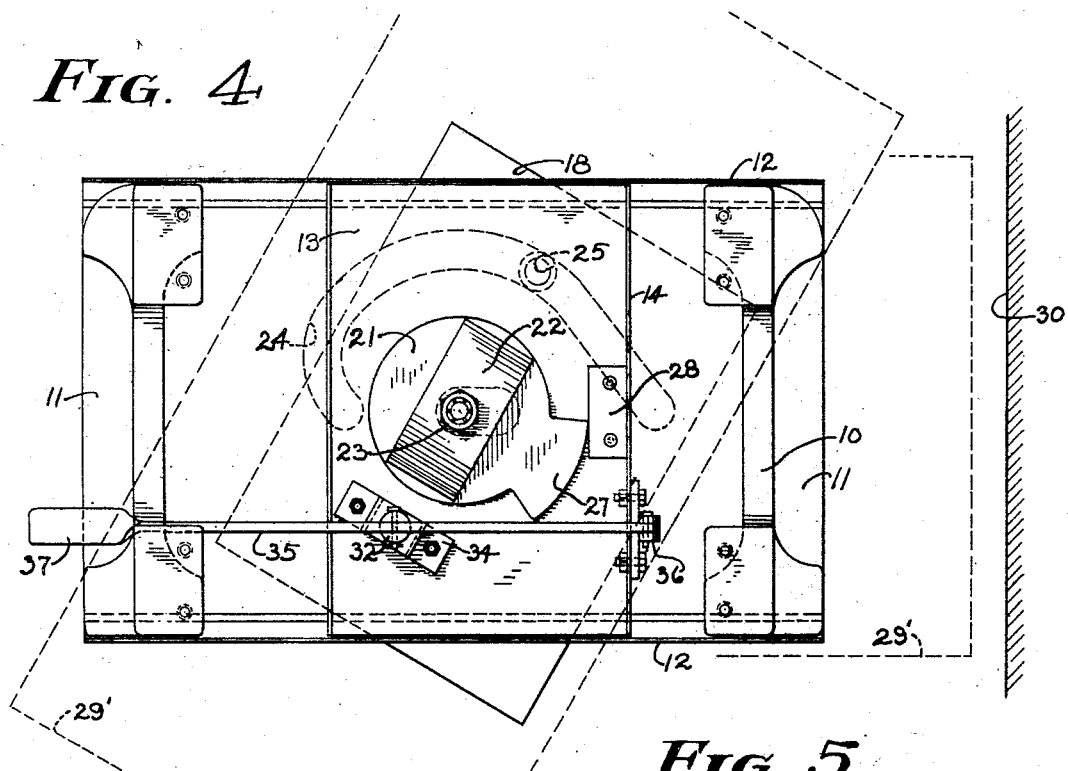
Fig. 4 is a bottom plan view of the seat pedestal, the seat being at an intermediate angular position.

In these drawings, the numeral 10 designates a pair of spaced crickets or standards, to the upper flanged ends of which is secured a pressed metal base plate 11 having reenforcing flanges 12 along its longitudinal edges. The base plate 11 of the seat pedestal thus formed is further reenforced at a central region between the crickets by a transverse pressed metal channel plate 13 secured in abutment with the under face of the base plate 11 and having depending side flanges 14 arranged at right angles to the flanges 12. A ribbed plate-like cam member 15 is fixedly secured, as by riveting, to the upper face of the base plate 11 above the reenforcing plate 13, some of the rivets extending through the entire assembly comprising the base plate, reenforcing plate and cam member. A slot 16 is formed in the cam member 15 at a central apertured portion of the base plate 11 and receives therethrough a vertically disposed pivot pin 17 which is fixedly secured at its reduced upper end to a seat mounting plate 18, a washer 19 on the pin being interposed between the seat mounting plate 18 and the upper bearing surface of the cam member. An enlarged intermediate cylindrical portion 20 of the pivot pin 17 fits within the slot 16 and is capable of relative lateral movement therein to extreme positions at the ends of the slot. The pivot pin 17 projects downwardly through openings in the plates 11 and 13 and has mounted thereon against relative rotation a plate-like guide cam 21 which bears against the under surface of the reenforcing plate 13. The guide cam is held in engagement with the plate 13 by an arched spring 22 which has its end portions in contact with the guide cam and an apertured intermediate portion receiving the end of the pivot pin 17 therethrough, the spring being placed under compression by a castellated nut 23 threaded onto the end of the pivot pin. In this manner the compression of the spring serves to hold the seat mounting plate 18 firmly against the upper bearing surface of the cam member 15.

A scroll-shaped or half-heart shaped cam slot 24 is formed in the cam member 15 in spaced relation about the slot 16 and has its terminal portions in alignment with the longitudinal axis of the slot 16, one terminal portion of the cam slot 24 being closer to the slot 16 than the other terminal portion. The end region of the cam slot 24 closer to the slot 16 is curved, while the other end region is straight and at an angle with respect to the slot 16. Both end portions of the cam slot 24 are equidistant from one end of the slot 16, which latter end is the normal location of the pivot pin 17, as hereinafter described. A roller 25 is disposed within the cam slot 24 and is pivotally mounted on a bolt 26 depending from and secured to the seat mounting plate 18. In the position of the mechanism shown in Figs. 1 and 5 of the drawings the roller 25 is shown to be at that end of the cam slot 24 more remote from the slot 16.

In the placement of the cam slot 24 the intermediate portion of the slot is struck on a radius from that end portion of the slot 16 not normally occupied by the pivot pin 17, as indicated in Fig. 2. In order to urge the pivot pin to this end of the slot 16 during the intermediate and major portion of the pin travel, as hereinafter described, the guide cam 21 is provided with a projecting sector-shaped lobe 27, which is adapted to slidingly engage the edge of a shoe 28 fixedly secured to the bottom face of the reenforcing plate 13, as indicated in Fig. 4.

Figure 5:
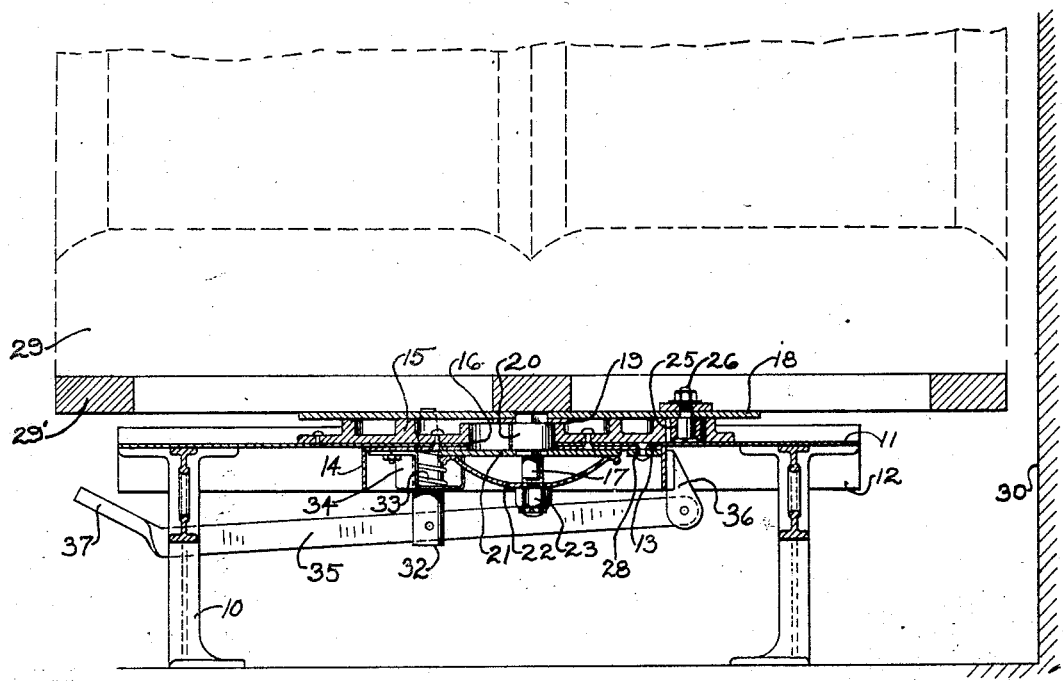
Fig. 5 is a longitudinal sectional view of the seat reversing mechanism taken on the line 5—5 of Fig. 1, the superposed seat being shown in dotted lines.

A two-passenger seat 29 of the fixed frame type has its sub-frame 29' secured to the upper face of the seat mounting plate 18, one end of the seat being disposed close to and parallel with the car wall 30, as shown in Figs. 1, 4 and 5. The two-passenger seat shown in the drawings is of the so-called individual type including an intermediate partition for separating the passengers occupying the seat.

In order to lock the seat in alternative positions, as hereinafter described, the seat mounting 18 is provided with suitably placed openings 31 adapted to receive a slidably mounted locking pin 32 urged upwardly into locking engagement with the plate by a coil spring 33 disposed within a U-shaped sheet metal strap 34. A foot-operated releasing lever 35 is pivotally mounted on a bracket 36 secured to that depending flange 14 of the reenforcing plate 13 nearer the wall of the car, and the free end of the lever 34 is provided with a pedal 37 which is disposed beneath the seat at the end of the seat pedestal adjacent the aisle of the car. The locking pin 32 is pivotally mounted on an intermediate portion of the releasing lever 35 so as to be withdrawn from locking engagement with the seat mounting plate 18 when the pedal of the releasing lever is depressed by the foot.

In that position of the seat shown in Figs. 1 and 5 of the drawings, the roller 25 is at that end of the cam slot 24 nearer to the car wall 30. When it is necessary to swing the seat half way around to face in the opposite direction, the pedal lever 35 is depressed which withdraws the locking bolt out of locking engagement with its recess 31 in the seat plate 18. The seat mounting plate 18 and its attached seat are then free to be swung on their pivot pin 17, which is accomplished by grasping the seat at any convenient portion. In such movement, the roller 25 travels away from the end of the cam slot 24, the walls of which co-operate with the roller to displace the pivot pin 17 away from the car wall 30 and to the opposite end of the slot 16, thereby providing additional clearance so that the inner corner of the seat may clear the car wall during such swinging movement. When the roller 25 reaches an intermediate portion of the cam slot 24, there is a tendency for the pivot pin 17 to prematurely move in the slot 16 which would result in binding and possible interference of the seat with the car wall as the seat approaches its terminal position. Such movement of the pin is prevented, however, by the engagement of the sector 27 of the guide cam 21 keyed to the pivot pin, the cam sector bearing against the block 28 to retain the pivot pin at the outer end of the slot 16 for a substantial part of its arc of movement. As the roller 25, in its continued movement, approaches the end portions of the cam slot 24, the cam sector 27 leaves the block 28 and the cam action of the cam slot on the roller then forces the pivot pin to its normal position at the opposite end of the slot 16 closer to the car wall, the roller 25 finally coming to rest at the end of the cam slot in alignment with the slot 16. The spring-urged locking pin 32 then snaps into engagement with the opposite locking recess 31 in the seat plate 18, thereby locking the seat in its proper position with respect to the car wall. When it is desired to later face the seat in its original position, the pin-releasing lever 35 is again depressed and the cycle of operation is repeated in the reverse direction. In either seat placing manipulation, there is combined with the motion of rotation a motion of translation to provide additional swing clearance at the car wall.

The release of the locking pin 32 by the lever 35 need be effected by only a momentary depression of the lever sufficient to permit initial rotation of the seat, the upper end of the pin thereafter slidably engaging the lower surface of the seat mounting plate until the pin registers with the other locking recess 31 into which it is then spring urged. If, for any reason, it is desired to face the seat in any other positions, this can be accomplished by providing one or more additional locking recesses 31 in the seat mounting plate.

The degree of compression of the arched spring 22, which holds the seat mounting plate in abutment with the upper bearing surface of the cam member 15, is so selected as to permit fairly easy rotation of the seat mounting plate, but at the same time the compression should be sufficient to avoid much movement of the seat when a passenger seats himself or braces himself when seated.

The invention provides a car seat reversing mechanism of simple and inexpensive construction to receive a two-passenger car seat of the fixed frame type possessing good proportions and affording comfortable seating, the mechanism permitting placement of the seat in alternative positions without interfering with the car wall or reducing aisle space.

What I claim as new and desire to secure by Letters Patent is:

1. A car seat reversing mechanism, comprising a seat pedestal including a horizontal portion having a pivot-receiving slot and an arcuate cam slot about said pivot-receiving slot with its end portions in permanent alignment with the vertical plane of said pivot-receiving slot, a seat mounting plate bearing on said horizontal member and carrying a seat, a guide portion carried by said seat mounting plate and depending into said cam slot, a pivot pin carried by said seat mounting plate and depending into said pivot-receiving slot, and means for holding said seat mounting plate in engagement with said seat pedestal, said guide member being adapted to traverse said cam slot from end to end upon the reversal of said seat mounting plate and having a cam action on the walls of said cam slot for displacing said pivot pin out of normal position in said pivot-receiving slot in order to provide swing clearance between the corner portions of said seat and an adjacent car wall.

2. A car seat reversing mechanism, comprising a seat pedestal including a horizontal portion having a pivot-receiving slot and an arcuate cam slot about said pivot-receiving slot with its end portions in permanent alignment with the vertical plane of said pivot-receiving slot, a seat mounting plate bearing on the horizontal portion of said seat pedestal and carrying a seat, a guide member carried by said seat mounting plate and depending into said cam slot, a pivot pin carried by said seat mounting plate and depending into said pivot-receiving slot, means for holding said seat mounting plate in engagement with said seat pedestal, said guide member being adapted to traverse said cam slot from end to end upon the reversal of said seat mounting plate and having a cam action on the walls of said cam slot for displacing said pivot pin out of normal position in said pivot-receiving slot in order to provide clearance between the corner portions of said seat and an adjacent car wall during the swinging movement of said seat, and means for retaining said pivot pin in displaced position in said pivot-receiving slot during the travel of said guide member at intermediate portions of said cam slot.

3. A car seat reversing mechanism, comprising a seat pedestal having a pivot-receiving slot and a cam slot about said pivot-receiving slot, a seat mounting plate bearing on said seat pedestal and carrying a seat, a guide member carried by said seat mounting plate and depending into said cam slot, a pivot pin carried by said seat mounting plate and depending into said pivot-receiving slot, means for holding said seat mounting plate in engagement with said seat pedestal, said guide member being adapted to traverse said cam slot upon the reversal of said seat mounting plate and having a cam action on the walls of said cam slot for displacing said pivot pin out of normal position in said pivot-receiving slot in order to provide swing clearance between the corner portions of said seat and an adjacent car wall, and means including a guide element rotatable with said pivot pin for retaining said pivot pin in displaced position during the travel of said guide member at intermediate portions of said cam slot.

4. A car seat reversing mechanism, comprising a seat pedestal including a horizontal portion having a pivot-receiving slot and an arcuate cam slot about said pivot-receiving slot, a seat mounting plate bearing on the horizontal portion of said seat pedestal and carrying a seat, a guide member carried by said seat mounting plate and depending into said cam slot, a pivot pin carried by said seat mounting plate and depending into said pivot-receiving slot, and resilient means for holding said seat mounting plate downwardly in engagement with said seat pedestal, said guide member being adapted to traverse said cam slot upon the reversal of said seat mounting plate and having a cam action on the walls of said cam slot for displacing said pivot pin out of normal position in said pivot-receiving slot in order to provide swing clearance between the corner portions of said seat and an adjacent car wall.

5. A car seat reversing mechanism, comprising a pedestal member and a movable member bearing thereon and carrying a seat, one of said members having both a pivot-receiving slot and an arcuate cam slot about said pivot-receiving slot, a guide member carried by the other of said members and extending into said cam slot, a pivot pin carried by said last-named member and extending into said pivot-receiving slot, and means for holding said members in relatively slidable engagement, said guide member being adapted to relatively traverse said cam slot upon the reversal of said seat and having a cam action on the walls of said cam slot for laterally displacing said pivot pin out of normal position in said pivot-receiving slot in order to provide swing clearance between the corner of said seat and an adjacent car wall.

6. A car seat reversing mechanism, comprising a pedestal member and a movable member bearing thereon and carrying a seat, one of said members having a pivot-receiving slot, a pivot carried by the other of said members and extending into said slot, a plate slidably bearing on said pedestal member on the side thereof opposite said pivot-carrying member and receiving said pivot therethrough, spring means bearing on said plate and cooperating with said pivot for retaining said pedestal member and movable member in bearing engagement, and cam means operative upon the relative rotation of said members for relatively displacing said pivot out of normal position in said slot to provide swing clearance between the corner portions of said seat and an adjacent car wall.

7. A car seat reversing mechanism, comprising a pair of spaced standards, a flanged plate connecting the upper portions of said standards, a second flanged plate secured on the underside of said first-named plate and at an intermediate portion thereof, a cam plate fixed to the upper face of said first-named plate and above said second-named plate, said cam plate having both a pivot-receiving slot and an arcuate cam slot about said pivot-receiving slot with its end portions in permanent alignment with the vertical plane of said pivot-receiving slot, a seat mounting plate bearing on said cam plate and carrying a seat, a pivot carried by said seat mounting plate and depending into said pivot-receiving slot, a guide member carried by said seat plate and depending into said cam slot, and resilient means for holding said seat mounting plate in engagement with said cam plate, said guide member being adapted to traverse said cam slot from end to end upon the reversal of said car seat and having a cam action on the walls of said cam slot for displacing said pivot out of normal position in said pivot-receiving slot to provide swing clearance between the corner portions of said seat and an adjacent car wall.

8. A car seat reversing mechanism, comprising a pedestal member and a movable seat-carrying member slidably bearing thereon, one of said members having a pivot-receiving slot, a pivot carried by the other of said members and extending into said slot, a leaf spring including an intermediate portion receiving said pivot member therethrough and acting on said pivot member for urging said movable member into engagement with said pedestal member, and cam means operative upon relative rotation of said members for relatively displacing said pivot out of normal position in said slot during the swinging movement of said seat-carrying member.

9. A car seat reversing mechanism, comprising a pedestal member and a movable seat-carrying member slidably bearing thereon, one of said members having a pivot-receiving slot, a pivot carried by the other of said members and extending into said slot, cam means operative upon the relative rotation of said members for relatively displacing said pivot out of normal position in said slot during the swinging of said seat-carrying member, and a guide element carried by said pivot for retaining said pivot in said displaced position during the swinging of said seat-carrying member.

10. A car seat reversing mechanism, comprising a pedestal member and a movable seat-carrying member slidably bearing thereon, one of said members having a pivot-receiving slot, a pivot carried by the other of said members and extending into said slot, cam means operative upon the relative rotation of said members for relatively displacing said pivot out of normal position in said slot during the swinging of said seat-carrying member, and means for retaining said pivot in said displaced position during the swinging of said seat-carrying member.

In testimony whereof, I affix my signature.

JOHN H. LUCAS.

CERTIFICATE OF CORRECTION.

Patent No. 1,741,784.                                          Granted December 31, 1929, to

JOHN H. LUCAS.

It is hereby certified that error appears in the printed specification of the above numbered patent requiring correction as follows: Page 3, line 49, claim 1, for the word "member" read "portion", and line 50, for "portion" read "member"; and that the said Letters Patent should be read with these corrections therein that the same may conform to the record of the case in the Patent Office.

Signed and sealed this 21st day of January, A. D. 1930.

(Seal)                                        M. J. Moore,
                                                   Acting Commissioner of Patents.